US009363409B2

(12) United States Patent
Rhoads et al.

(10) Patent No.: US 9,363,409 B2
(45) Date of Patent: Jun. 7, 2016

(54) IMAGE MANAGEMENT SYSTEM AND METHODS USING DIGITAL WATERMARKS

(75) Inventors: Geoffrey B. Rhoads, West Linn, OR (US); Neil E. Lofgren, White Salmon, WA (US); Philip R. Patterson, Sherwood, OR (US)

(73) Assignee: Digimarc Corporation, Beaverton, OR (US)

( * ) Notice: Subject to any disclaimer, the term of this patent is extended or adjusted under 35 U.S.C. 154(b) by 1114 days.

(21) Appl. No.: 10/423,489

(22) Filed: Apr. 25, 2003

(65) Prior Publication Data

US 2004/0046774 A1  Mar. 11, 2004

Related U.S. Application Data

(63) Continuation-in-part of application No. 09/800,093, filed on Mar. 5, 2001, now Pat. No. 7,061,510, and a continuation-in-part of application No. 10/002,954, filed on Oct. 23, 2001, now Pat. No. 7,042,470, which (Continued)

(51) Int. Cl.
*H04N 1/32* (2006.01)
*G06F 17/30* (2006.01)

(52) U.S. Cl.
CPC ........ *H04N 1/32144* (2013.01); *G06F 17/3028* (2013.01); *H04N 1/32149* (2013.01); *H04N 1/32352* (2013.01); *H04N 1/3232* (2013.01); *H04N 2201/3233* (2013.01); *H04N 2201/3252* (2013.01); *H04N 2201/3253* (2013.01); *H04N 2201/3254* (2013.01)

(58) Field of Classification Search
CPC ... G06T 1/0021; G06T 1/0028; G06T 1/0042; G06T 1/005; H04N 1/3232; H04N 1/32144; H04N 1/32352; H04N 1/32149
USPC ......... 715/802, 808, 835; 701/211; 345/231.9
See application file for complete search history.

(56) References Cited

U.S. PATENT DOCUMENTS 4,504,910 A    3/1985   Araki et al.
4,631,678 A   12/1986   Angermiiller
(Continued)

FOREIGN PATENT DOCUMENTS

EP    0 947 953 A2   10/1999
EP    0 953 938 A2   11/1999
(Continued)

OTHER PUBLICATIONS

Zhu et al., "Multiresolution Watermarking for Images and Video", Jun. 1999, IEEE Transactions on Circuits and Systems for Video Technology, vol. 9, No. 4, pp. 545-550.*

(Continued)

*Primary Examiner* — Patrick Riegler
*Assistant Examiner* — Nicholas Klicos

(57) ABSTRACT

The present invention relates to image management systems and methods. In one implementation we provide a method to provide geo-location feedback corresponding to an image area selected by a user. A digital watermark embedded in the selected image area is decoded, and the decoded digital watermark includes or points to geo-location information associated with the selected image location. In another implementation we provide an alert engine to notify a network station that information associated with a digital watermark identifier is available.

32 Claims, 9 Drawing Sheets

Related U.S. Application Data is a continuation-in-part of application No. 09/800,093, application No. 10/423,489, which is a continuation-in-part of application No. 10/100,233, filed on Mar. 13, 2002, now Pat. No. 6,664,976, which is a continuation-in-part of application No. 09/858,336, filed on May 15, 2001.

(60) Provisional application No. 60/376,720, filed on Apr. 29, 2002, provisional application No. 60/383,474, filed on May 23, 2002, provisional application No. 60/284,163, filed on Apr. 16, 2001, provisional application No. 60/284,776, filed on Apr. 18, 2001.

(56) References Cited

U.S. PATENT DOCUMENTS

| | | | | |
|---|---|---|---|---|
| 5,113,445 | A | 5/1992 | Wang | |
| 5,214,757 | A | 5/1993 | Mauney et al. | |
| 5,278,763 | A * | 1/1994 | Agnew et al. | 701/520 |
| 5,280,537 | A | 1/1994 | Sugiyama | |
| 5,329,108 | A | 7/1994 | Lamoure | |
| 5,385,371 | A | 1/1995 | Izawa | |
| 5,499,294 | A | 3/1996 | Friedman | |
| 5,502,576 | A | 3/1996 | Ramsay et al. | |
| 5,664,018 | A | 9/1997 | Leighton | |
| 5,734,752 | A * | 3/1998 | Knox | 358/3.28 |
| 5,764,770 | A | 6/1998 | Schipper et al. | |
| 5,790,703 | A * | 8/1998 | Wang | 358/3.28 |
| 5,799,082 | A | 8/1998 | Murphy et al. | |
| 5,812,962 | A | 9/1998 | Kovac | |
| 5,822,432 | A * | 10/1998 | Moskowitz et al. | 380/28 |
| 5,825,892 | A | 10/1998 | Braudaway et al. | |
| 5,859,920 | A * | 1/1999 | Daly et al. | 382/115 |
| 5,861,841 | A | 1/1999 | Gildea et al. | |
| 5,864,623 | A | 1/1999 | Messina et al. | |
| 5,875,249 | A | 2/1999 | Mintzer et al. | |
| 5,889,868 | A * | 3/1999 | Moskowitz et al. | 713/176 |
| 5,889,898 | A | 3/1999 | Koren et al. | |
| 5,901,178 | A | 5/1999 | Lee et al. | |
| 5,905,800 | A * | 5/1999 | Moskowitz et al. | 380/28 |
| 5,905,819 | A * | 5/1999 | Daly | 382/284 |
| 5,919,730 | A | 7/1999 | Gasper et al. | |
| 5,943,422 | A | 8/1999 | Van Wie et al. | |
| 5,946,414 | A * | 8/1999 | Cass et al. | 382/183 |
| 5,958,051 | A | 9/1999 | Renaud et al. | |
| 5,964,821 | A | 10/1999 | Brunts et al. | |
| 5,987,136 | A | 11/1999 | Schipper et al. | |
| 5,990,826 | A | 11/1999 | Mitchell | |
| 6,005,936 | A | 12/1999 | Shimizu | |
| 6,031,914 | A | 2/2000 | Tewfik et al. | |
| 6,081,827 | A | 6/2000 | Reber et al. | |
| 6,088,394 | A | 7/2000 | Maltby | |
| 6,108,434 | A * | 8/2000 | Cox et al. | 382/100 |
| 6,122,403 | A | 9/2000 | Rhoads | |
| 6,130,741 | A | 10/2000 | Wen et al. | |
| 6,148,091 | A | 11/2000 | DiMaria | |
| 6,175,639 | B1 | 1/2001 | Satoh et al. | |
| 6,181,802 | B1 | 1/2001 | Todd | |
| 6,185,312 | B1 | 2/2001 | Nakamura et al. | |
| 6,198,832 | B1 * | 3/2001 | Maes et al. | 382/100 |
| 6,205,249 | B1 | 3/2001 | Moskowitz | |
| 6,243,480 | B1 | 6/2001 | Zhao et al. | |
| 6,246,777 | B1 | 6/2001 | Agarwal et al. | |
| 6,249,226 | B1 | 6/2001 | Harrison | |
| 6,263,438 | B1 | 7/2001 | Walker et al. | |
| 6,282,362 | B1 | 8/2001 | Murphy et al. | |
| 6,282,648 | B1 | 8/2001 | Walker et al. | |
| 6,289,453 | B1 | 9/2001 | Walker | |
| 6,301,360 | B1 | 10/2001 | Bocionek et al. | |
| 6,310,956 | B1 | 10/2001 | Morito et al. | |
| 6,311,214 | B1 | 10/2001 | Rhoads | |
| 6,320,829 | B1 | 11/2001 | Matsumoto et al. | |
| 6,324,573 | B1 | 11/2001 | Rhoads | |
| 6,332,149 | B1 | 12/2001 | Warmus et al. | |
| 6,332,193 | B1 | 12/2001 | Glass et al. | |
| 6,341,350 | B1 | 1/2002 | Miyahara et al. | |
| 6,343,138 | B1 | 1/2002 | Rhoads | |
| 6,351,439 | B1 | 2/2002 | Miwa et al. | |
| 6,385,329 | B1 * | 5/2002 | Sharma et al. | 382/100 |
| 6,389,151 | B1 | 5/2002 | Carr et al. | |
| 6,400,826 | B1 * | 6/2002 | Chen et al. | 382/100 |
| 6,401,206 | B1 | 6/2002 | Khan et al. | |
| 6,408,082 | B1 | 6/2002 | Rhoads et al. | |
| 6,408,331 | B1 | 6/2002 | Rhoads | |
| 6,411,725 | B1 | 6/2002 | Rhoads | |
| 6,418,232 | B1 | 7/2002 | Nakano et al. | |
| 6,421,145 | B1 * | 7/2002 | Kurita et al. | 358/448 |
| 6,421,450 | B2 * | 7/2002 | Nakano | 382/100 |
| 6,427,020 | B1 | 7/2002 | Rhoads | |
| 6,448,979 | B1 | 9/2002 | Schena | |
| 6,463,416 | B1 | 10/2002 | Messina | |
| 6,476,833 | B1 * | 11/2002 | Moshfeghi | 715/854 |
| 6,493,514 | B1 | 12/2002 | Stocks et al. | |
| 6,496,802 | B1 | 12/2002 | van Zoest | |
| 6,498,984 | B2 | 12/2002 | Agnew et al. | |
| 6,504,571 | B1 * | 1/2003 | Narayanaswami et al. | 348/231.99 |
| 6,505,160 | B1 | 1/2003 | Levy et al. | |
| 6,512,835 | B1 | 1/2003 | Numao | |
| 6,522,770 | B1 | 2/2003 | Seder et al. | |
| 6,526,155 | B1 | 2/2003 | Wang et al. | |
| 6,529,615 | B2 | 3/2003 | Hendrickson et al. | |
| 6,532,541 | B1 | 3/2003 | Chang et al. | |
| 6,542,927 | B2 | 4/2003 | Rhoads | |
| 6,556,688 | B1 | 4/2003 | Ratnakar | |
| 6,571,021 | B1 * | 5/2003 | Braudaway | 382/275 |
| 6,611,607 | B1 * | 8/2003 | Davis et al. | 382/100 |
| 6,614,914 | B1 | 9/2003 | Rhoads et al. | |
| 6,625,297 | B1 | 9/2003 | Bradley | |
| 6,628,802 | B1 * | 9/2003 | Braudaway et al. | 382/100 |
| 6,636,249 | B1 | 10/2003 | Rekimoto | |
| 6,650,761 | B1 | 11/2003 | Rodriguez et al. | |
| 6,664,976 | B2 | 12/2003 | Lofgren et al. | |
| 6,683,966 | B1 * | 1/2004 | Tian et al. | 382/100 |
| 6,707,927 | B1 * | 3/2004 | Kita et al. | 382/100 |
| 6,879,701 | B1 * | 4/2005 | Rhoads | 382/100 |
| 6,915,432 | B1 * | 7/2005 | Braudaway et al. | 713/176 |
| 6,950,519 | B2 | 9/2005 | Rhoads | |
| 7,042,470 | B2 | 5/2006 | Rhoads et al. | |
| 7,061,510 | B2 | 6/2006 | Rhoads | |
| 7,084,903 | B2 * | 8/2006 | Narayanaswami et al. | 348/207.99 |
| 7,098,931 | B2 | 8/2006 | Patterson et al. | |
| 7,099,492 | B2 | 8/2006 | Rhoads | |
| 7,184,572 | B2 | 2/2007 | Rhoads et al. | |
| 7,197,160 | B2 | 3/2007 | Rhoads et al. | |
| 7,254,249 | B2 | 8/2007 | Rhoads et al. | |
| 7,274,475 | B1 * | 9/2007 | Ito | 358/1.15 |
| 7,502,489 | B2 | 3/2009 | Rhoads | |
| 7,502,490 | B2 | 3/2009 | Rhoads et al. | |
| 7,650,008 | B2 | 1/2010 | Rhoads | |
| 2001/0001854 | A1 | 5/2001 | Schena et al. | |
| 2001/0019611 | A1 | 9/2001 | Hilton | |
| 2001/0022667 | A1 | 9/2001 | Yoda | |
| 2001/0023421 | A1 | 9/2001 | Messina | |
| 2001/0026377 | A1 | 10/2001 | Ikegami | |
| 2001/0026616 | A1 | 10/2001 | Tanaka | |
| 2001/0026629 | A1 | 10/2001 | Oki | |
| 2001/0030759 | A1 * | 10/2001 | Hayashi et al. | 358/1.9 |
| 2001/0031064 | A1 | 10/2001 | Donescu et al. | |
| 2001/0033674 | A1 | 10/2001 | Chen et al. | |
| 2001/0034835 | A1 | 10/2001 | Smith | |
| 2001/0039546 | A1 | 11/2001 | Moore et al. | |
| 2001/0046307 | A1 | 11/2001 | Wong | |
| 2001/0051964 | A1 | 12/2001 | Warmus et al. | |
| 2001/0054150 | A1 * | 12/2001 | Levy | G06F 21/10 713/176 |
| 2001/0055407 | A1 * | 12/2001 | Rhoads | 382/100 |
| 2002/0001395 | A1 | 1/2002 | Davis et al. | |
| 2002/0002679 | A1 | 1/2002 | Murakami et al. | |
| 2002/0006212 | A1 * | 1/2002 | Rhoads et al. | 382/100 |
| 2002/0009209 | A1 | 1/2002 | Inoue et al. | |
| 2002/0033844 | A1 * | 3/2002 | Levy et al. | 345/744 |

(56) References Cited

U.S. PATENT DOCUMENTS

| | | | |
|---|---|---|---|
| 2002/0044690 A1 | 4/2002 | Burgess | |
| 2002/0046178 A1 | 4/2002 | Morito et al. | |
| 2002/0057340 A1 | 5/2002 | Fernandez | |
| 2002/0059520 A1 | 5/2002 | Murakami et al. | |
| 2002/0065844 A1 | 5/2002 | Robinson | |
| 2002/0069370 A1 | 6/2002 | Mack et al. | |
| 2002/0075298 A1 | 6/2002 | Schena et al. | |
| 2002/0080396 A1 | 6/2002 | Silverbrook et al. | |
| 2002/0095586 A1 | 7/2002 | Doyle et al. | |
| 2002/0095601 A1 | 7/2002 | Hind et al. | |
| 2002/0106105 A1 | 8/2002 | Pelly et al. | |
| 2002/0122564 A1 | 9/2002 | Rhoads et al. | |
| 2002/0124024 A1* | 9/2002 | Patterson et al. | 707/517 |
| 2002/0124171 A1 | 9/2002 | Rhoads | |
| 2002/0124173 A1 | 9/2002 | Stone | |
| 2002/0126869 A1 | 9/2002 | Wang et al. | |
| 2002/0135600 A1 | 9/2002 | Rhoads et al. | |
| 2002/0136531 A1 | 9/2002 | Harradine | |
| 2002/0147910 A1* | 10/2002 | Brundage et al. | 713/176 |
| 2002/0159765 A1 | 10/2002 | Maruyama et al. | |
| 2002/0168069 A1 | 11/2002 | Tehranchi et al. | |
| 2002/0170966 A1* | 11/2002 | Hannigan et al. | 235/462.01 |
| 2002/0188841 A1* | 12/2002 | Jones et al. | 713/153 |
| 2002/0191810 A1 | 12/2002 | Fudge et al. | |
| 2003/0011684 A1 | 1/2003 | Narayanaswami | |
| 2003/0012562 A1 | 1/2003 | Lawandy et al. | |
| 2003/0032033 A1 | 2/2003 | Anglin et al. | |
| 2003/0040326 A1 | 2/2003 | Levy et al. | |
| 2003/0040957 A1* | 2/2003 | Rodriguez et al. | 705/14 |
| 2003/0048908 A1 | 3/2003 | Hamilton | |
| 2003/0053654 A1 | 3/2003 | Patterson et al. | |
| 2003/0063319 A1 | 4/2003 | Umeda et al. | |
| 2003/0069693 A1 | 4/2003 | Snapp et al. | |
| 2003/0074556 A1 | 4/2003 | Chapman et al. | |
| 2003/0083098 A1 | 5/2003 | Yamazaki et al. | |
| 2003/0083957 A1* | 5/2003 | Olefson | 705/27 |
| 2003/0090690 A1 | 5/2003 | Katayama et al. | |
| 2003/0215110 A1 | 11/2003 | Rhoads et al. | |
| 2004/0162981 A1 | 8/2004 | Wong | |
| 2004/0201676 A1 | 10/2004 | Needham | |
| 2004/0221244 A1* | 11/2004 | Baldino | 715/835 |
| 2006/0117180 A1* | 6/2006 | Kalker | 713/176 |
| 2007/0052730 A1 | 3/2007 | Patterson et al. | |
| 2007/0116325 A1 | 5/2007 | Rhoads et al. | |
| 2008/0025561 A1 | 1/2008 | Rhoads et al. | |
| 2008/0080737 A1 | 4/2008 | Rhoads et al. | |
| 2009/0238403 A1 | 9/2009 | Rhoads et al. | |
| 2010/0067734 A1 | 3/2010 | Rhoads | |

FOREIGN PATENT DOCUMENTS

| | | |
|---|---|---|
| EP | 935 872 | 11/2001 |
| EP | 1220152 | 7/2002 |
| GB | 2371934 | 8/2002 |
| JP | 2000 41144 A | 2/2000 |
| WO | WO99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

Barni et al., "Text-Based Geometric Normalization for Robust Watermarking of Digital Maps", 2001, IEEE, pp. 1082-1085.*

Kang et al., "A Vector Watermarking Using the Generalized Square Mask", 2001, IEEE, pp. 234-236.*

Yeo et al., "Watermarking 3D Objects for Verification", Jan.-Feb. 1999, IEEE Computer Graphics and Applications, pp. 36-45.*

U.S. Appl. No. 09/571,422, filed May 15, 2000, Rodriguez et al.

Notice of Allowance (dated Dec. 17, 2004), Appeal Brief (dated Sep. 20, 2004) and Office Action (dated May 7, 2004) from parent U.S. Appl. No. 09/800,093.

Notice of Allowance (dated Dec. 17, 2004), Appeal Brief (dated Sep. 20, 2004) and Office Action (dated May 14, 2004) from assignee's U.S. Appl. No. 10/002,954.

Bender et al., "Techniques for Data Hiding," SPIE vol. 2420, Jan. 1995, pp. 164-173.

Caronni, "Assuring Ownership Rights for Digital Images," Published in the Proceedings of 'Reliable IT Systems,' VIS '95, HH. Brüggemann and W. Gerhardt-Häckl (Ed.), Vieweg Publishing Company, Germany, 1995, Jun. 14, 1994, 10 pages.

Carp, "Seven wonders of the imaging world", International Contact, Oct./Nov. 2000, pp. 36/I-36/IV.

"Digital Watermarking, The Unseen Advantage," Geo Informatics, Jun. 2001 (3 pages).

Friedman, "The Trustworthy Digital Camera: Restoring Credibility to the Photographic Image," IEEE Transactions on Consumer Electronics, vol. 39, No. 4, Nov. 1993, pp. 905-910.

http://web.archive.org/web/20010305033241/http://www.kodak.com/country/US/en/corp/researchDevelopement/technologyFeatures/digitalWatermarking.shtml, "Invisible Watermarking", archive date of Mar. 5, 2001 (4 pages, including Internet Archive Wayback Machine cover page).

Koch et al., "Digital Copyright Labeling: Providing Evidence of Misuse and Tracking Unauthorized Distribution of Copyrighted Materials," Oasis Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao "Digital Watermark Mobile Agents," Proc. of NISSC'99, Arlington, VA, Oct. 18-21, 1999, pp. 138-146.

* cited by examiner

IMAGE MANAGEMENT SYSTEM AND METHODS USING DIGITAL WATERMARKS

RELATED APPLICATION DATA

This patent application claims the benefit of U.S. Provisional Patent Application Nos. 60/376,720, filed Apr. 29, 2002 and 60/383,474, filed May 23, 2002. This patent application is also a continuation in part of U.S. patent application Ser. No. 09/800,093, filed Mar. 5, 2001 (published as US 2002-0124171 A1; now U.S. Pat. No. 7,061,510). This patent application is also a continuation in part of U.S. patent application Ser. No. 10/002,954, filed Oct. 23, 2001 (published as US 2002-0122564 A1; now U.S. Pat. No. 7,042,470), which is a continuation in part of U.S. patent application Ser. No. 09/800,093, filed Mar. 5, 2001. The Ser. No. 10/002,954 application also claims the benefit of U.S. Provisional Patent Application Nos. 60/284,163, filed Apr. 16, 2001 and 60/284,776, filed Apr. 18, 2001. The present patent application is also a continuation in part of U.S. patent application Ser. No. 10/100,233 (published as US 2002-0154144 A1; now U.S. Pat. No. 6,664,976), filed Mar. 13, 2002 and a continuation in part of U.S. patent application Ser. No. 09/858,336, filed May 15, 2001 (published as US 2002-012.4024 A1; now U.S. Pat. No. 7,098,931). The Ser. No. 10/100,233 application claims the benefit of U.S. Provisional Patent Application No. 60/284,776. The present patent application is also related to Ser. No. 09/833,013 (published as US 2002-0147910 A1), PCT application PCT/US02/06858 (published as WO 02/071685) and concurrently filed U.S. patent application Ser. No. 10/423,834 (published as US 2004-0008866 A1), titled "Geographic Information Systems Using Digital Watermarks." Each of these above patent documents is herein incorporated by reference.

FIELD OF THE INVENTION

The present invention relates to image management and processing, and is particularly illustrated in the context of management of satellite and other aerial imagery.

BACKGROUND AND SUMMARY OF THE INVENTION

Acquisition of aerial imagery traces its history back to the Wright brothers, and is now commonly performed from satellite and space shuttle platforms, in addition to aircraft.

While the earliest aerial imagery relied on conventional film technology, a variety of electronic sensors are now more commonly used. Some collect image data corresponding to specific visible, UV or IR frequency spectra (e.g., the Multi-Spectral Scanner and Thematic Mapper used by the Landsat satellites). Others use wide band sensors. Still others use radar or laser systems (sometimes stereo) to sense topological features in three dimensions. Other types of image collection rely on electro-optical panchromatic (grayscale), multi-spectral (less than 20 bands) and hyper-spectral (20 bands or more). Some satellites can even collect ribbon imagery (e.g., a raster-like, 1-dimensional terrestrial representation, which is pieced together with other such adjacent ribbons).

The quality of the imagery has also constantly improved. Some satellite systems are now capable of acquiring image and topological data having a resolution of less than a meter. Aircraft imagery, collected from lower altitudes, provides still greater resolution.

A huge quantity of aerial imagery is constantly being collected. Management and coordination of the resulting large data sets is a growing problem. Integrating the imagery with related information is also a problem In accordance with one aspect of the present invention, digital watermarking technology is employed to help manage such imagery and related information, among other benefits.

The foregoing and additional features and advantages of the present invention will be more readily apparent from the following detailed description with reference to the following figures.

DETAILED DESCRIPTION

Figure 1:
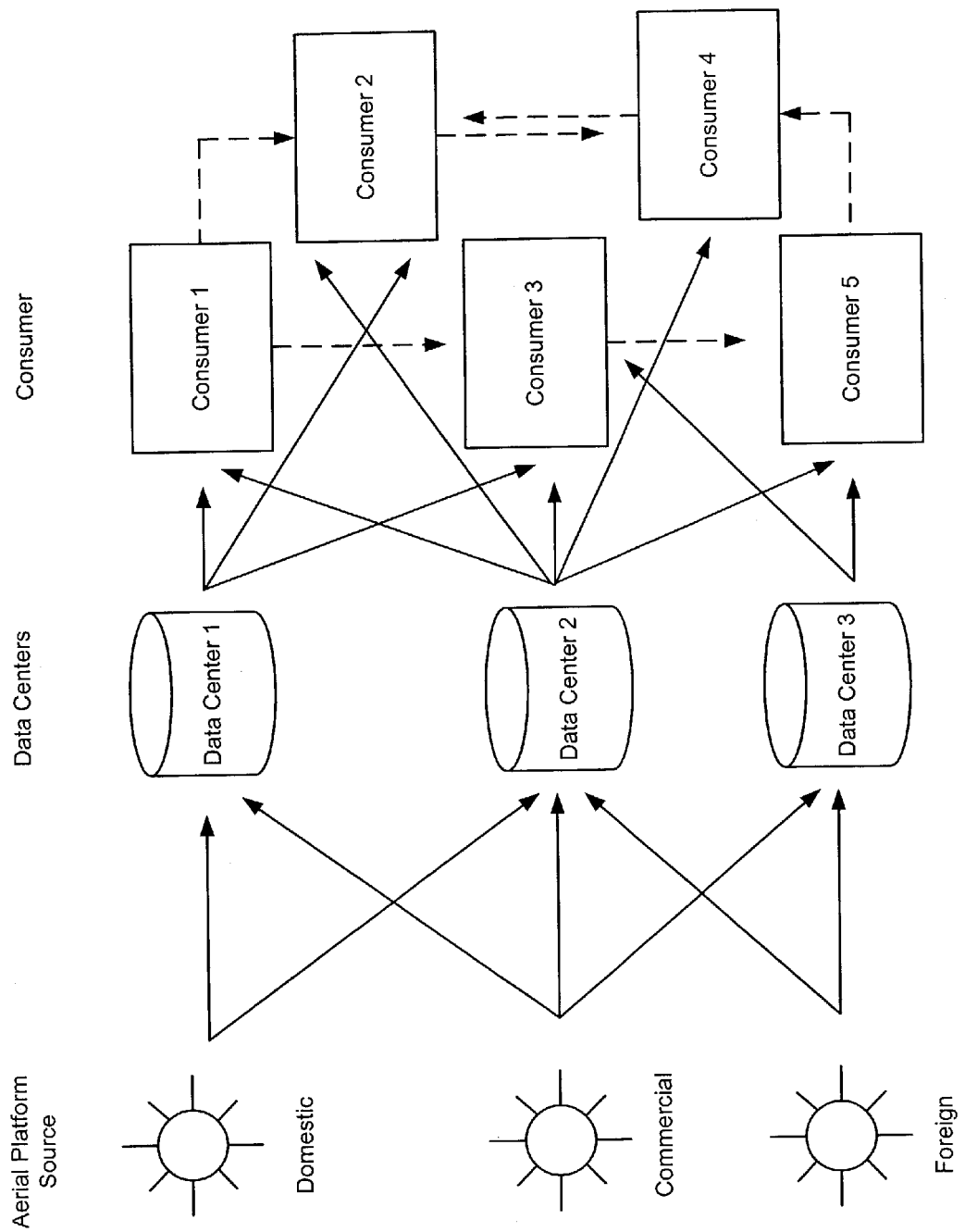
FIG. 1 illustrates an image distribution channel.

For expository convenience, the following section focuses on satellite and aerial "imagery" to illustrate the principles of the invention. The principles of the invention, however, are equally applicable to other forms of aerial surveillance data and other topographic/mapping information. Accordingly, the term "image" should be used to encompass all such other data sets, and the term "pixel" should be construed to encompass component data from such other data sets.

When new aerial imagery is received, it is generally necessary to identify the precise piece of earth to which it corresponds. This operation, termed "georeferencing" or "geocoding," can be a convoluted art and science.

In many systems, the georeferencing begins with a master reference system (e.g., latitude and longitude) that takes into account the earth's known deformities from a sphere. Onto this reference system the position of the depicted region is inferred, e.g., by consideration of the satellite's position and orientation (ephemeris data), optical attributes of the satellite's imaging system (e.g., resolution, magnification, etc.), and models of the dispersion/refraction introduced by the earth's atmosphere.

In applications where precise accuracy is required, the foregoing, "ephemeris," position determination is refined by comparing features in an image with the placement of known features on the earth's surface (e.g., buildings and other man-placed objects, geological features, etc.) and compensating the georeference determination accordingly. Thus, for example, if the actual latitude and longitude of a building is known (e.g., by measurement from a ground survey—"ground truth"), and the corresponding latitude and longitude of that building as indicated in the georeferenced satellite imagery is different, the reference system applied to the satellite data can be altered to achieve a match. (Commonly, three or more such ground truth points are used so as to assure accurate correction.) Of course these processes can involve both manual and automated steps.

Regardless of the georeferencing techniques used, once determined, a digital watermark can be used to convey geo-coordinates (or other georeferencing information—hereafter both referred to as geo-coordinates). The geo-coordinates can be as simple as longitude and latitude, or can be more finely referenced, e.g., with a geovector as described in our related applications. The georeferencing may also include image scale and/or orientation. A digital watermark can include the geo-coordinates as a message or payload. Or the watermark can include an identifier or index that is used to access or interrogate a geo-coordinate database. Some suitable digital watermarking techniques are disclosed in assignee's U.S. patent application Ser. No. 09/503,881 (now U.S. Pat. No. 6,614,914) and in U.S. Pat. No. 6,122,403. Each of these patent documents is herein incorporated by reference. Of course other digital watermarking techniques can be suitably interchanged with some aspects of the present invention.

One inventive aspect of the present invention is to, when indexes or identifiers are used, randomly or pseudo-randomly vary watermark identifiers used by a particular image capture device or watermarking station. Or a block of identifiers can be pseudo-randomly generated and then delivered to a watermark embedding station. Varying the identifier will help prevent would be pirates from determining which identifiers originate from a particular node or embedding station.

Digital watermarking an aerial image offers a host of advantages. A watermark can be used to convey both static information and dynamic information. Examples of static information are the geo-coordinates of the image depicted in the image, the time and day the image was captured, and a source type indicator. The source type indicator can indicate the imaging source, e.g., governmental or commercial, the imaging sensor used to capture the image, or even the aerial image capture platform, e.g., satellite, unmanned aircraft, etc. The source type indicator can be used to regulate access to the image. Of course the static information can be conveyed directly by a digital watermark or can be accessed via a data record associated with the watermark identifier. Examples of dynamic information are analyst reports, current weather conditions in the depicted area, notes, related images and information, etc.

In our parent applications, identified-above, we disclose techniques by which an image region is embedded with a digital watermark so as to unique identify that particular region of a map, image or photograph (e.g., to identify an image area, building, a road, a lake, etc.). The digital watermark can convey (or point to) information that identifies the subject area's center location, boundaries, corners, or object coordinates, etc. Essentially, when taking an image as a whole, the digital watermark(s) vary from block to block (or area to area) within the image to accommodate the unique identifiers. The block size can be finely referenced, e.g., a digital watermark can be embedded to uniquely identify a block of pixels and even an area represented by a single pixel.

An inventive aspect of the present invention utilities multiple watermarks in an image to provide a user with geo-reference feedback. Consider the following example. A user pulls up an image on her computer monitor via image handling software (e.g., Word (Microsoft), PhotoShop (Adobe), ArcView (ESRI), Imagine (Erdas), RemoteView (Sensor System), etc., etc.). The image previously has been segmented into blocks (or other shapes) and the blocks are embedded with unique digital watermarks. The segmentation is preferably imperceptible to the user. Each watermark per block or area conveys or points to geo-coordinate information that is associated with the block or area. Software instructions (e.g., a plug-in, cooperating or separate program) cooperate with the image handling software and computer's mouse (or touch screen) to provide the feedback. As the user positions her mouse (e.g., as shown on-screen as a standard "arrow" or pointer), the user is presented with the geo-coordinates associated with the subject location. The presentation can take a myriad of forms ranging, e.g., from text, box-up boxes, graphics, etc. (From a more technical viewpoint, a mouse screen-location position is provided from the mouse (or mouse driver) to the operating system and/or to the image handling software (or cooperating instructions). The image handling software (or cooperating software instructions) coordinates the screen-location with the displayed image. A digital watermark corresponding to the pointed-to-area (i.e., the mouse screen-location position) is decoded and the geo-coordinate information is presented, perhaps after accessing additional information from a database. As an alternative, each digital watermark, or a group of digital watermarks, within an image are decoded once the image is pulled up on a monitor. The watermark identifier or payloads are associated with a particular displayed area. Then, when a user selects or points to a particular area, the geo-coordinates can be displayed without first having to decode the digital watermark.).

Figure 9:
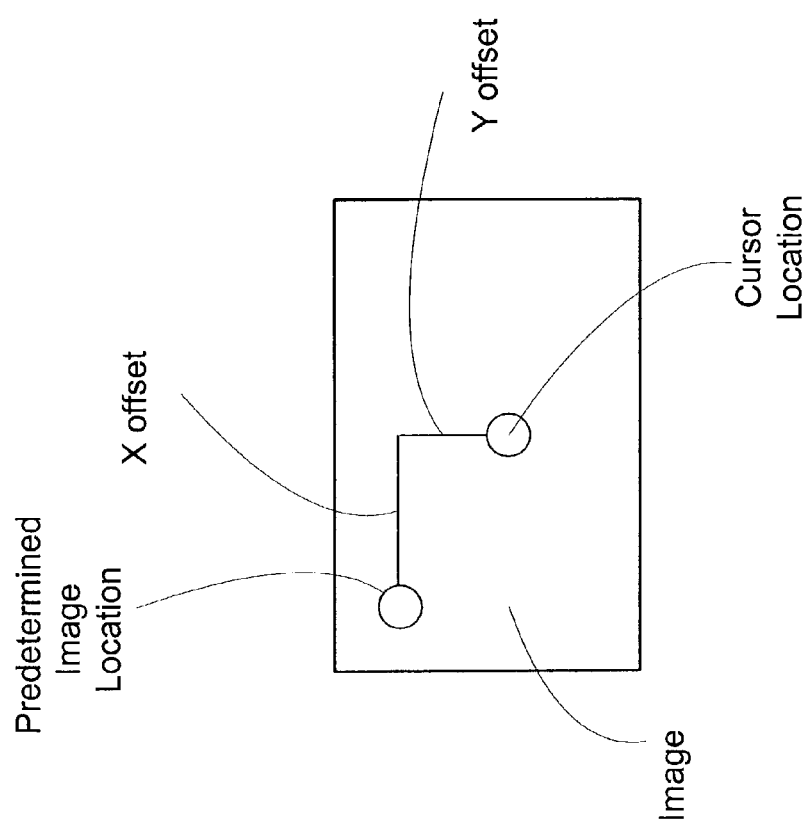
FIG. 9 illustrates a method to determine a geocoordinate for a selected image area.

One alternative implementation, illustrated in FIG. 9, involves determining a geospatial location in an image that is pointed to, e.g., by a mouse cursor. An image is embedded, perhaps redundantly, with a digital watermark. The digital watermark includes an identifier or message that points to a file (e.g., GIS layer, XML file, etc.) including geocoordinates for areas depicted in the image. The geocoordinates can be laid out in a grid-like manner. Each grid cell includes a geo-coordinate of a corresponding area depicted in the image. A cursor location is determined. Then an XY offset is calculated to reflect the location of the cursor with respect to a predetermined image or application location. For example, the XY offset is calculated from the upper most left corner of the image, or from an image location marked with a predetermined digital watermark component. (The XY offset can be measured in terms of pixels or image block areas, or other image distance standard.). The offset is used to register the cursor location with a cell in the raster grid. The data file is accessed with the digital watermark identifier, and the appropriate cell or geographic coordinate data point is determined from the XY offset. The geocoordinates are provided to the user, e.g., through a graphical user interface. In a related implementation, a log of image manipulation is recorded and is used to adjust the registration of the cursor location with the geocoordinates. Or, if the digital watermark includes a so-called orientation component, the watermark orientation component can be used to help realign the image to correct for image distortion. Once realigned, the geo-coordinates associated with a pointed to image area can be determined and displayed. (We note that the geocoordinates need not be laid out in a grid-like manner. Instead, the coordinates can be referenced to the image in terms of an offset from a predetermined image location.).

Instead of only presenting the user with geo-coordinates, the feedback can be significantly enhanced. Consider, for example, right-clicking the mouse while the cursor is pointed to a particular image location. The right click activates a pop-up window (or separate application, like a media player or Windows Explorer, Internet browser, etc.). The pop-up window provides news broadcasts, if available, audio/video clip, related text that is associated with the location pointed to by the mouse cursor. From another perspective, the digital watermark embedded in the image at the cursor location is decoded. The embedded watermark carries or points to a geolocation. Information associated with the geolocation (or watermark identifier) is identified and is then presented to the user via a window or media player.

(Of course, it should be appreciated that instead of a mouse cursor, a touch screen, touch pen, optical receptor screen (e.g., one activate by a laser pointer), etc. can be used instead of a mouse. Also, our use of the term "right click" is not limiting. Other conventional techniques of activating computer functionality can be suitably interchanged with a "right-click.").

High-resolution images are huge in terms of the digital bytes required to represent the image. Often, such large images are down-sampled in order to efficiently display or print image areas. Down sampling may reduce the image resolution but it also reduces the file or area byte size, making the down-sampled image easier to handle. While down sampling provides a faster and perhaps easier way to handle image, it can complicate the watermark detection process. Accordingly, in one implementation, we embedded a digital watermark at different resolutions within the image. Varying the number of pixels used for a watermark component can achieve this "multi-scale" watermark. For example, for a high-resolution scale, a low number of pixels (maybe even only one pixel) is used to convey the watermark component; yet for a lower-resolution scale, the same watermark component is conveyed over a higher number of pixels, oh say a 6×6 block or 20×20 block of pixels. In this way our watermark is detectable at multiple resolutions.

Digital watermarks form the backbone in an image distribution system (FIG. 1). Aerial imagery (e.g., satellite, aircraft, etc.) is captured from a number of sources, e.g., domestic (e.g., U.S. government), commercial and foreign (e.g., foreign governments). An image is communicated to any one of a number of data centers 1-3 (e.g., corresponding to government, civil and non-government centers). The image is digitally watermarked to include a unique identifier. As discussed, the unique identifier may comprise a geo-location and/or capture time, imaging platform, or the identifier can be a serial number that is used to link to related information. The embedding preferably occurs prior to storage at a data center, so that the image can be stored and retrieved in the data center via the identifier. In some implementations the watermark(s) conveys information for different areas represented in the image.

The watermark provides a persistent identifier that is used to manage requests for imagery, as well as tracking and managing the distribution of such images to consumers 1-5. Consumers may include government agencies, news and media, corporations, foreign entities, etc., etc. If desired, every action (or a subset of actions) that is carried out on the image can be reported to the data center for logging. For example, if an image is copied to a disk, such action is reported to the data center. Or if the image is cropped, scaled and printed, such is reported and recorded—thus creating an audit trail. The audit trail can include user or device information as well. The image can be tracked via the identifier even as it is widely distributed. From a system level, a security software module monitors images for a watermark embedded therein. The software module preferably resides on each client system (e.g., computer terminal) in a closed network. Once detected, a watermark is decoded to obtain its identifier. The identifier is reported to a registry or data center, along with the particular action, which triggered the decoding (e.g., printing, storing to disk, editing, etc.).

Figure 2:
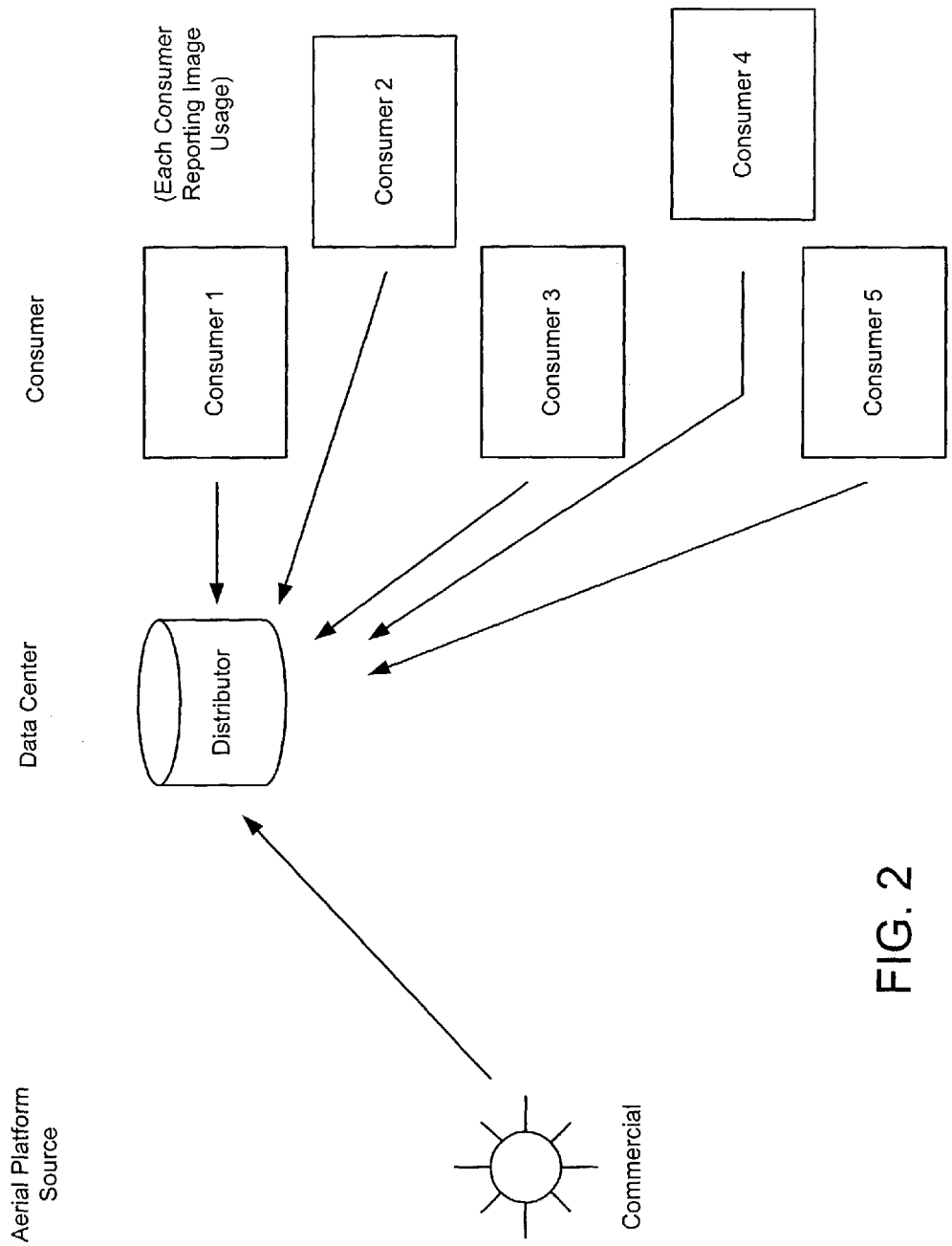
FIG. 2 illustrates license compliance facilitated via digital watermarks.

The digital watermark also simplifies license compliance and reporting. With reference to FIG. 2, images are distributed to a number of consumers 1-5. The consumers can report image usage associated with the digital watermark. (We note that a watermark can also help enforce license terms, e.g., by providing copy or viewing restriction flags, by triggering reporting or activity logging, by limiting access based on environment or security clearance, etc., etc. The watermark may also be used as a security measure. The watermark can be used to carry security clearance information, or ensure that the related image is not distributed in an unauthorized channel.).

Figure 3:
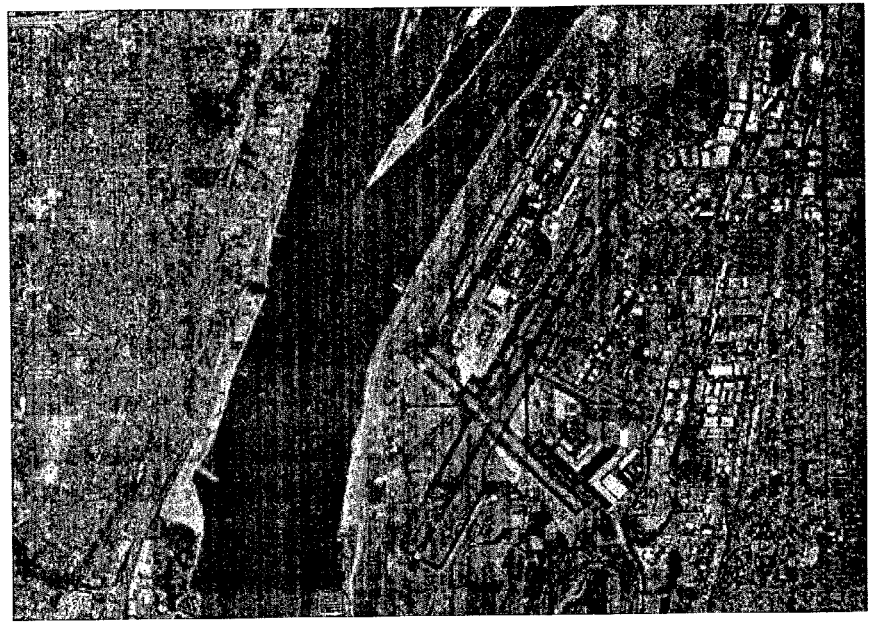
FIGS. 3-7 illustrate an image registration process, including an event broadcast feature.
Figure 3:
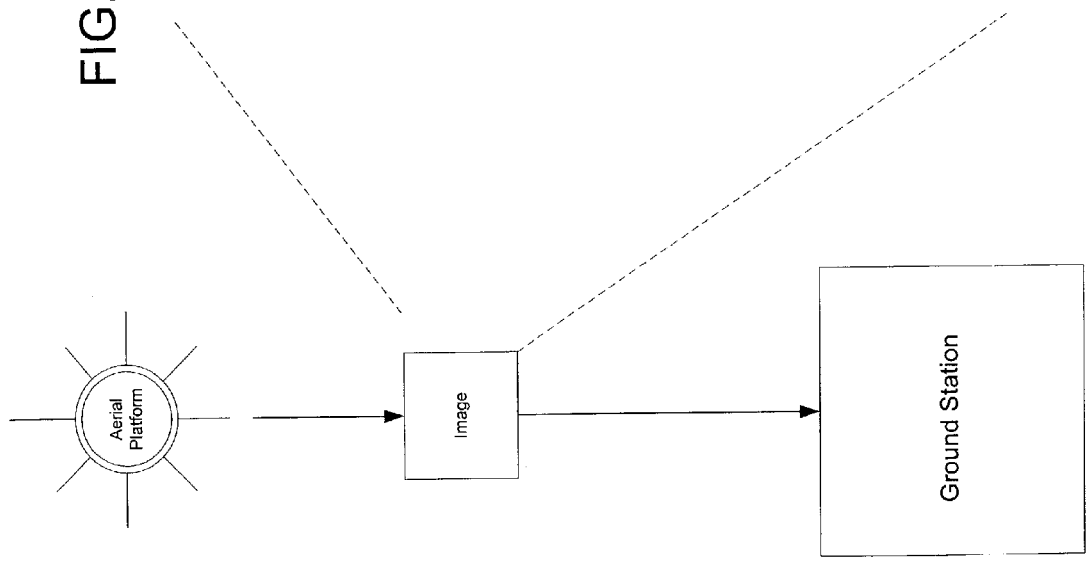
Figure 4:
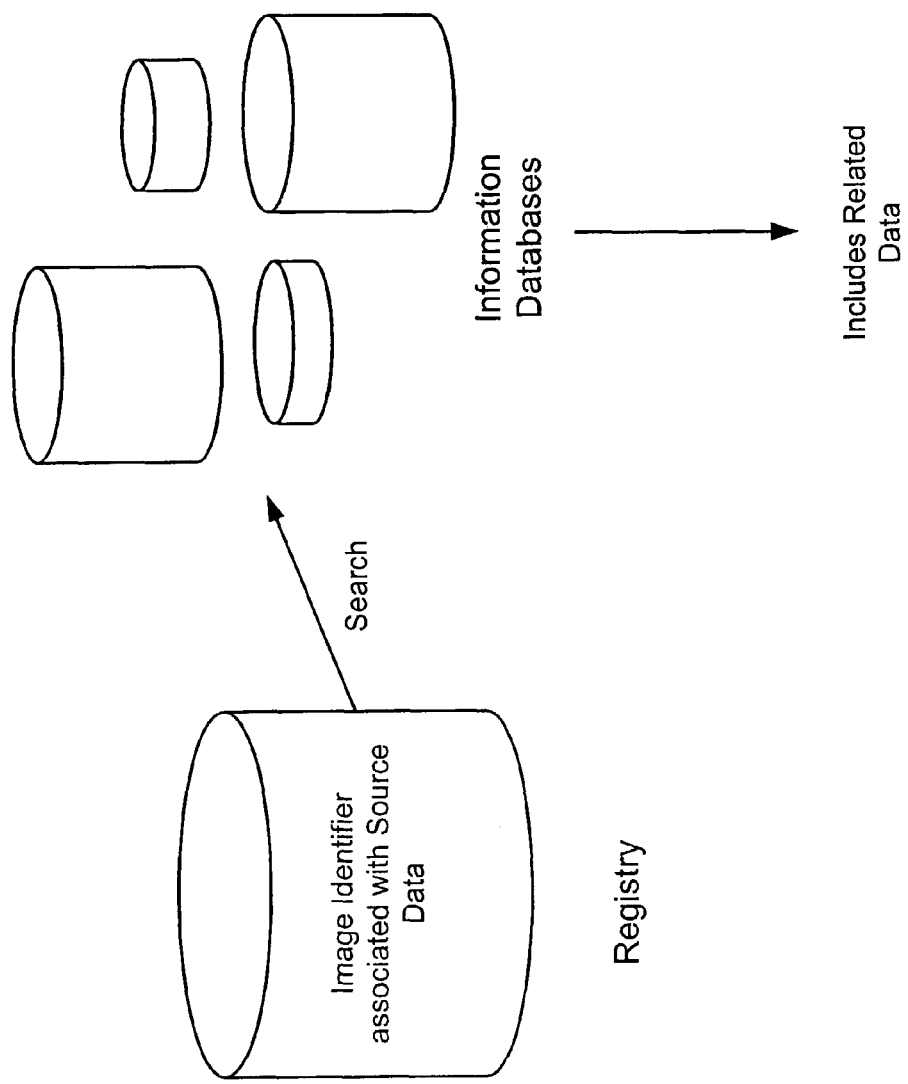

Our watermarks can be used in even more robust settings. Consider the system shown in FIGS. 3-7. An image is captured from an aerial platform (see FIG. 3). The captured image becomes "source data." The source data is digitally watermarked to include a unique identifier as discussed above. (We note that a typical image capture method is illustrated in FIG. 3; that is, a satellite captures an image and then communicates such to a ground station. The watermark embedding is preferably carried out at the ground station or at an associated data center or registry. However, as we have discussed in our related applications, the image-capturing platform (in the FIG. 3 example, a satellite) itself can achieve the watermarking.).

The digitally watermarked source data (e.g., the captured image) is stored in a registry. The act of storing the source data in the registry preferably triggers a searching process. (Alternatively, an automatic schedule or manual input triggers the searching process.) One objective of the searching is to find information that is related to the source data, e.g., via geolocation or depicted subject matter. The types of information are limitless, and can include related images, notes, reports, data, history, news from a broadcast, geographic information system (GIS) layers and libraries, audio or video, imagery in libraries, geo-calibration data, periodicals and current or archived newspapers, current or historical weather, governmental and cultural information, consumer demographics, etc., etc. Searching can be facilitated in a number of ways. For example, the search may include searching for information associated with the source data's watermark identifier. The value of this searching method is particularly evident when the watermark identifier is associated with a geolocation. In alternative searching implementations the searching includes using the depicted geocoordinates as searching criteria. In other implementations the searching is facilitated by key words associated with depicted areas, associated political regions, associated cultures, depicted structures and/or other information depicted in the source data. The key words can be carried by a digital watermark. The searching becomes fully automated, since a digital watermark decoder can retrieve the key words from a watermark, and then communicate the key words to a search engine associated with specific data libraries. Or suppose, for example, that the source data depicts the Washington Monument. The key word search may involve searching databases, news sources, the internet, etc. for information related to the "Washington monument." Or if the source data depicts Boise, Id., a key word search may include the terms "Boise" and/or "Idaho." (Of course, the search can include alternative techniques such as topic searching, directed searching, etc., etc.). The related data, once identified, is associated in the data registry according to the unique identifier. Of course, instead of duplicating the related data, the data repository can include links to or addresses of the related data. Enhanced searching methods, such as those disclosed in assignee's U.S. patent application Ser. Nos. 09/636,102 and 10/118,468 (published as US 2002-0188841 A1), can be implemented to populate the registry as well.

If the embedding is being carried out at a ground station, and not the data registry, the registry can serve as a unique identifier repository, to help ensure that identifiers do not collide. A ground station can query the registry to obtain an appropriate identifier. The registry (or perhaps a match filter, as discussed below with respect to FIG. 7, or client software plug-in) can also serve as a watchdog or audit tracker. A watchdog function limits access to the source and related data based on clearance, environment, or security access. A digital watermark can help convey such limitations.

Figure 5:
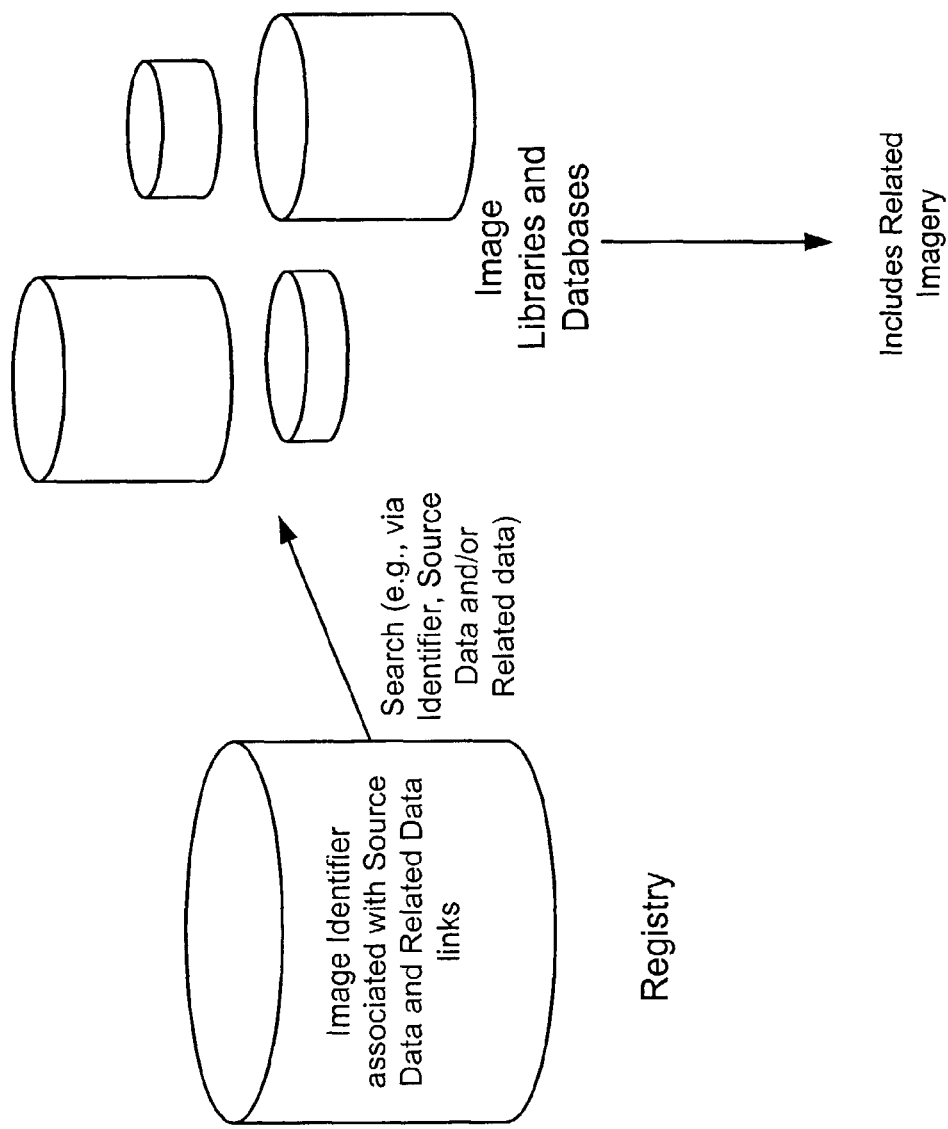

The search can also extend into image libraries. Previously captured images, identified via geo-location or other referencing identifiers, can be associated with the source data as "related imagery." This image-centric search is shown in FIG. 5.

Figure 6:
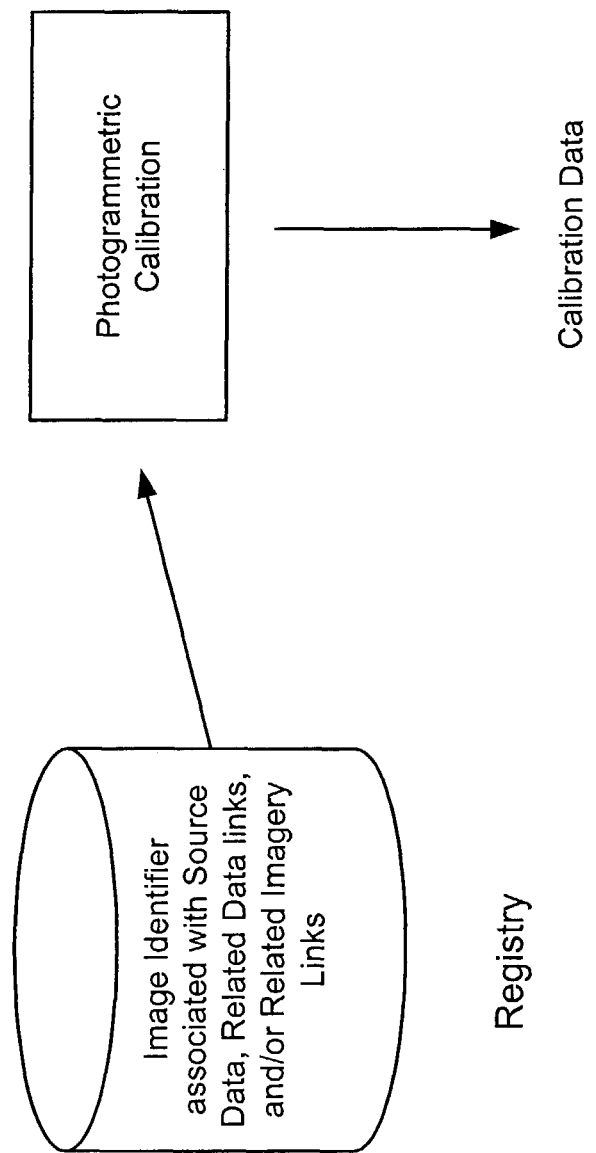

At some point in the registry process, the source data preferably undergoing a georeferencing (or photogrammetric) process (FIG. 6). As discussed in this and the related applications, the source data undergoes an analysis that maps each image pixel, or block of pixels to a geolocation. This process can be used to derive the unique watermark identifier or to create geo-coordinates for storage in the registry. The timing of this process is not critical, unless the watermark identifier directly depends on this georeferencing. Otherwise the georeferencing can take place at any time in the registry-populating process.

Figure 7:
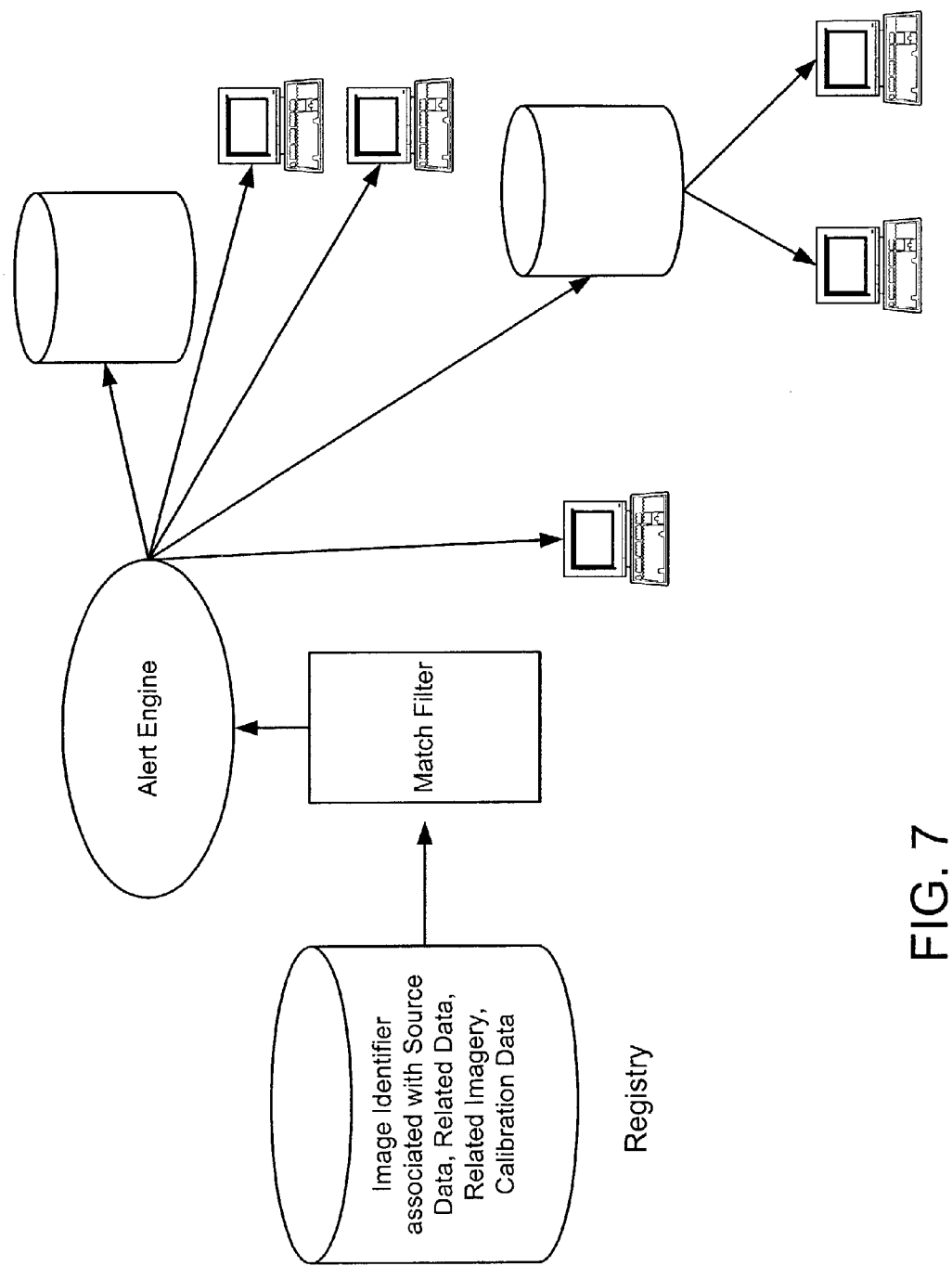

A match filter is used in connection with the registry (FIG. 7). The match filter preferably includes algorithms or protocols to direct information to certain network nodes or terminals. Information can be directed based on predetermined preferences or requests, or by subject matter. Or the match filter can serve as a search engine to allow network nodes to intelligently query the registry. (We note that in some implementations, the registry is distributed and is mirrored as needed. The match filter can be similarly distributed.). In one implementation, the match filter monitors data locations (e.g., such as databases, records, network sites or storage sites) that may include data identified by a watermark identifier or geo-location. New data received at these data locations can be tracked/recorded and optionally announced or pushed to the interested parties. In another implementation, the match filter filters information to users based on a user device that will receive the information. For example, the match filter may determine that a requesting device is a PDA (personal digital assistant) so the match filter sends a copy of the information that is compatible with the PDA. In this manner, the match filter can provide a context sensitive filter. (The term "context sensitive" can also imply security restrictions. For example, while the PDA may be able to process and handle a particular item, it may not be permissible to transmit the data to such a handheld device due to security concerns.).

Figure 8:
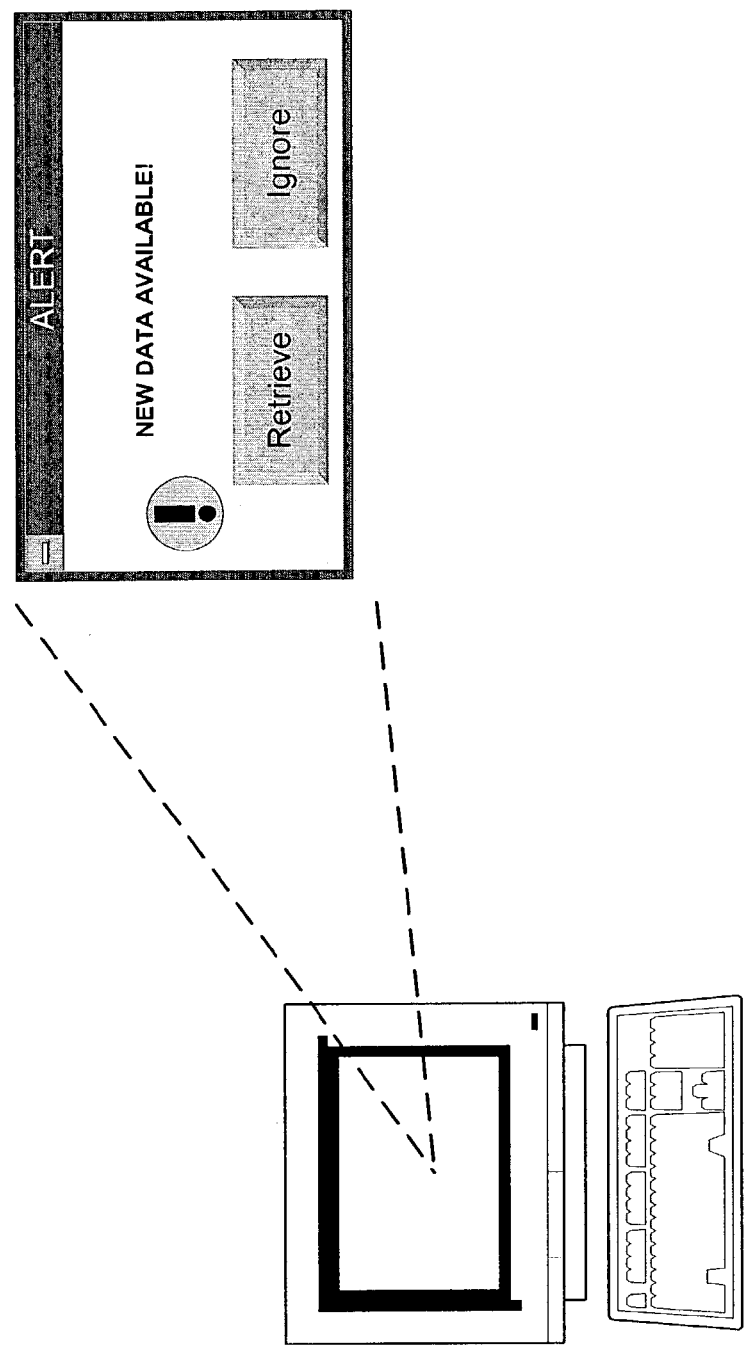
FIG. 8 illustrates a network terminal that has received an alert notification in the FIG. 7 environment.

The match filter can optionally include (or cooperate with) an alert engine. The alert engine monitors the registry and sends out an alert (see FIG. 8) when new or updated information is received in the registry. For example, the alert engine monitors which watermark identifiers (or geo-locations) are communicated to various network nodes. Then, if the registry receives new or updated information that is associated with the identifier, the alert engine sends out a notification or alert to that node. The alert can be manifested in a user terminal/GUI via a pop-up window (e.g., FIG. 8), graphical icon (e.g., a blinking icon in a desktop window or control bar), email, instant message, etc. In another implementation, a network node or terminal schedules an alert request with the alert engine. For example a user may indicate that she would like a notification when updated imagery arrives. The alert process can be relatively seamless for the user. The user terminal (or alert engine) extracts the digital watermark from an image that a user is currently viewing. The alert engine stores this identifier as one to watch for updates. A registry flag (or other indicator) that is associated with the identifier is set when an updated image is received into the registry. The alert engine recognizes the set flag and issues a notification to the user (or user terminal or network address). Or the user can similarly request information based on geo-location. The alter engine can also push fresh information (e.g., recently captured imagery) to a network node or terminal. Or breaking news (e.g., accessible via an internet link or audio/video/text message storage on a network site) can be similarly pushed to interested parties.

Another inventive feature is to allow for removal of an embedded digital watermark. There may be some image analysis that requires the original, unwatermarked image. In this case, the watermark or a registry record pointed to by the digital watermark can include embedding details (e.g., gain, perceptual masking, etc.), which will allow a watermark remover module to remove a digital watermark. The watermark identifier is read to retrieve the identifier. The identifier is then used to access the watermark embedding information to direct the removal module. In some implementations, the registry records image manipulation, which will help restore the image to a base or original level. The embedding information and, optionally, manipulation information, allows for the near-perfect removal of the watermark. (In an alternative implementation, the watermark is embedded according to a predetermined rule or protocol, and the removal module removes the watermark according to the predetermined rule or protocol. In other cases we employ a so-called "reversible" watermarking technique, as, e.g., discussed in assignee's U.S. patent application Ser. No. 10/319,404 (published as US 2003-0149879 A1), Ser. No. 10/319,380 (published as US 2003-0179900 A1), and PCT application no. PCT/US02/40162, published as WO 03/055130).

As indicated, the watermark(s) can identify the imaging system, the date/time of data acquisition, satellite ephemeris data, the identity of intervening systems through which the data passed, etc. One or more watermarks can stamp the image with unique identifiers used in subsequent management of the image data, or in management of meta data associated with the image.

There are additional benefits in creating a georeferenced registry system of images using digital watermarks. A classic notion in most standardizations across all industries is a notion of a "stamp" or "seal" or a similar concept to indicate that some object has successfully completed its appointed rounds. Call it branding, call it formality, or call it a soft form of "authenticity;" the historical momentum behind such a branding concept is huge. In one embodiment, to ensure that a given image is properly georeferenced (under a chosen standard) and/or registered in a database, digitally watermarking the given image provides a formalized "seal of approval." The digital watermark itself becomes the seal. In one embodiment, a watermark identifier is obtained from an online repository, which issues and tracks authentic identifiers. The repository can be queried to determine the date and time of issue. Or the identifier can be linked to a seal or company logo. Software and/or hardware is configured to routinely read embedded digital watermarks and display an appropriate brand logo, seal, or certification. The "seal" itself then becomes a functional element of a standardization process, serving many functions including permanent attachment to standardized and dynamic metadata.

CONCLUSION

The foregoing are just exemplary implementations of the present invention. It will be recognized that there are a great number of variations on these basic themes. The foregoing illustrates but a few applications of the detailed technology. There are many others.

Some watermarks used in the foregoing embodiments can be "fragile." That is, they can be designed to be lost, or to degrade predictably, when the data set into which it is embedded is processed in some manner. Thus, for example, a fragile watermark may be designed so that if an image is JPEG compressed and then decompressed, the watermark is lost. Or if the image is printed, and subsequently scanned back into digital form, the watermark is corrupted in a foreseeable way. (Fragile watermark technology is disclosed, e.g., in application Ser. Nos. 09/234,780, 09/433,104 (now U.S. Pat. No. 6,636,615), Ser. No. 09/498,223 (now U.S. Pat. No. 6,574,350), Ser. Nos. 09/562,516, 09/567,405, 09/625,577 (now U.S. Pat. No. 6,788,800), and Ser. No. 09/645,779 (now U.S. Pat. No. 6,714,683). Each of these patent applications is herein incorporated by reference.) By such arrangements it is possible to infer how a data set has been processed by the attributes of a fragile watermark embedded in the original data set.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are expressly contemplated.

There are many embodiments discussed herein which may benefit from the inclusion of two different watermarks. For example, a first watermark may include information regarding (or pointing to) georeferencing information, while a second watermark includes a database identifier or location. The second watermark may alternatively include (or point toward) information pertaining to events, people or animals identified in the photograph, occasions, groups, institutions, copyright ownership, etc. Or the embodiment may include both a robust watermark and a copy-tamper fragile watermark.

Although not belabored, artisans will understand that the systems described above can be implemented using a variety of hardware and software systems. One embodiment employs a computer or server with a large disk library, and capable database software (such as is available from Microsoft, Oracle, etc.). The registration, watermarking, and other operations can be performed in accordance with software instructions stored in the disk library or on other storage media, and executed by a processor (or electronic processing circuitry) in the computer as needed. (Alternatively, dedicated hardware, or programmable logic circuits, can be employed for such operations.).

In view of the wide variety of embodiments to which the principles and features discussed above can be applied, it should be apparent that the detailed embodiments are illustrative only and should not be taken as limiting the scope of the invention.

What is claimed is:

1. A method comprising:
    displaying an image on a system display, wherein the image comprises a plurality of imperceptible digital watermarks;
    receiving input corresponding to an image area within the image pointed to by a cursor, wherein the image area has a first digital watermark of the plurality of imperceptible watermarks embedded therein, wherein the first digital watermark is embedded through imperceptible changes to data representing the image area, wherein the first digital watermark comprises an identifier that links to a separate data record including geo-coordinates associated with the image area pointed to by the cursor, and wherein the identifier is obtained by decoding the first digital watermark embedded in the image area;
    determining, by a processor, a cursor location from the received input relative to a watermark location of the first digital watermark embedded in the image area;
    realigning the image using an orientation component to correct an image distortion of the image, wherein one of the plurality of digital watermarks comprises the orientation component;
    accessing, using the identifier, the separate data record to determine the geo-coordinates; and
    providing geo-location feedback via the system display based on the decoded first digital watermark, the geo-coordinates, and the cursor location, wherein the geo-location feedback comprises dynamic information related to the cursor location, and wherein the dynamic information comprises at least one of analyst reports related to the image area and current weather conditions for the image area.

2. The method of claim 1, wherein the cursor is controlled by at least one of a mouse or touch-screen display.

3. The method of claim 1, wherein the geo-location feedback comprises the geo-coordinates associated with the image area pointed to by the cursor.

4. The method of claim 3, wherein the geo-coordinates correspond to a particular grid cell of the image, wherein the image comprises a plurality of grid cells, and wherein each grid cell has corresponding geo-coordinates.

5. The method of claim 1, wherein the geo-location feedback is provided via a graphical user interface displayed by the system display.

6. The method of claim 5, wherein the geo-location feedback comprises an audio clip.

7. The method of claim 5, wherein the geo-location feedback comprises a multimedia presentation.

8. The method of claim 1, wherein the data record further comprises a plurality of geo-coordinates that are each spatially registered to the image, and wherein accessing the data record to determine the geo-coordinates comprises determining which of the plurality of geo-coordinates corresponds to the image area.

9. The method of claim 1, wherein the cursor location from the received input relative to the watermark location comprises a horizontal and vertical pixel distance.

10. The method of claim 1, wherein the first digital watermark is redundantly embedded at different resolutions in the image area.

11. The method of claim 1, wherein the separate data record comprises at least one of a geographic information system (GIS) layer and an XML file.

12. The method of claim 1, wherein the distance from the user pointer to the location of the first digital watermark comprises a horizontal and vertical amount of block areas, wherein each block area comprises a defined block of pixels of the image.

13. The method of claim 1, wherein a second digital watermark of the plurality of imperceptible digital watermarks is embedded in a second image area of the image, and further wherein the second digital watermark comprises a second identifier that links to the separate data record.

14. The method of claim 13, wherein the second identifier corresponds to a second geo-coordinates in the separate data record associated with the second image area.

15. The method of claim 13, wherein the second identifier comprises a databased identifier or location where the separate data record is stored.

16. The method of claim 13, wherein the second identifier corresponds to information in the separate data record pertaining to at least one of an event, people, and animals in the second image area.

17. The method of claim 1, wherein the plurality of imperceptible digital watermarks comprises a robust watermark and a copy-tamper fragile watermark.

18. The method of claim 13, wherein the second digital watermark comprises a source type indicator used to regulate access to the image.

19. A system, comprising:
a processor configured to:
  display an image on a system display, wherein the image comprises a plurality of imperceptible digital watermarks;
  receive input corresponding to an image area within the image pointed to by a cursor, wherein the image area has a first digital watermark of the plurality of imperceptible watermarks embedded therein, wherein the first digital watermark is embedded through imperceptible changes to data representing the image area, wherein the first digital watermark comprises an identifier that links to a separate data record including geo-coordinates associated with the image area pointed to by the cursor, and wherein the identifier is obtained by decoding the first digital watermark embedded in the image area;
  determine a cursor location from the received input relative to a watermark location of the first digital watermark embedded in the image area;
  realign the image using an orientation component to correct an image distortion of the image, wherein one of the plurality of digital watermarks comprises the orientation component;
  access, using the identifier, the separate data record to determine the geo-coordinates; and
  provide geo-location feedback via the system display based on the decoded first digital watermark, the geo-coordinates, and the cursor location, wherein the geo-location feedback comprises dynamic information related to the cursor location, and wherein the dynamic information comprises at least one of analyst reports related to the image area and current weather conditions for the image area.

20. The system of claim 19, wherein the cursor is controlled by at least one of a mouse or touch-screen display.

21. The system of claim 19, wherein the geo-location feedback comprises the geo-coordinates associated with the image area pointed to by the cursor.

22. The system of claim 21, wherein the geo-coordinates correspond to a particular grid cell of the image, wherein the image comprises a plurality of grid cells, and wherein each grid cell has corresponding geo-coordinates.

23. The system of claim 19, wherein the data record further comprises a plurality of geo-coordinates that are each spatially registered to the image, and wherein to determine the geo-coordinates the processor is configured to determine which of the plurality of geo-coordinates corresponds to the image area.

24. The system of claim 19, wherein the geo-location feedback is provided via a graphical user interface displayed by the system display.

25. The system of claim 19, wherein the cursor location from the received input relative to the watermark location comprises a horizontal and vertical pixel distance.

26. The system of claim 19, wherein the first digital watermark is redundantly embedded at different resolutions in the image area.

27. A non-transitory computer-readable medium having instructions stored thereon, the instructions comprising:
  instructions to display an image on a system display, wherein the image comprises a plurality of imperceptible digital watermarks;
  instructions to receive input corresponding to an image area within the image pointed to by a cursor, wherein the image area has a first digital watermark of the plurality of imperceptible watermarks embedded therein, wherein the first digital watermark is embedded through imperceptible changes to data representing the image area, wherein the first digital watermark comprises an identifier that links to a separate data record including geo-coordinates associated with the image area pointed to by the cursor, and wherein the identifier is obtained by decoding the first digital watermark embedded in the image area;
  instructions to determine a cursor location from the received input relative to a watermark location of the first digital watermark embedded in the image area;
  instructions to realign the image using an orientation component to correct an image distortion of the image, wherein one of the plurality of digital watermarks comprises the orientation component;
  instructions to access, using the identifier, the separate data record to determine the geo-coordinates; and
  instructions to provide geo-location feedback via the system display based on the decoded first digital watermark, the geo-coordinates, and the cursor location, wherein the geo-location feedback comprises dynamic information related to the cursor location, and wherein the dynamic information comprises at least one of analyst reports related to the image area and current weather conditions for the image area.

28. The non-transitory computer-readable medium of claim 27, wherein the cursor is controlled by at least one of a mouse or touch-screen display.

29. The non-transitory computer-readable medium of claim 27, wherein the geo-location feedback comprises the geo-coordinates associated with the image area pointed to by the cursor.

30. The non-transitory computer-readable medium of claim 29, wherein the geo-coordinates correspond to a particular grid cell of the image, wherein the image comprises a plurality of grid cells, and wherein each grid cell has corresponding geo-coordinates.

31. The non-transitory computer-readable medium of claim 27, wherein the data record further comprises a plurality of geo-coordinates that are each spatially registered to the image, and wherein determining the geo-coordinates comprises determining which of the plurality of geo-coordinates corresponds to the image area.

32. The non-transitory computer-readable medium of claim 27, wherein the geo-location feedback is provided via a graphical user interface displayed by the system display.

* * * * *